United States Patent
Yarragunta et al.

(10) Patent No.: US 12,490,407 B2
(45) Date of Patent: Dec. 2, 2025

(54) LIQUID COOLING MANIFOLD

(71) Applicant: Micron Technology, Inc., Boise, ID (US)

(72) Inventors: Suresh Reddy Yarragunta, Bangalore (IN); Deepu Narasimiah Subhash, Bangalore (IN); Ravi Kumar Kollipara, Telangana (IN)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 18/112,743

(22) Filed: Feb. 22, 2023

(65) Prior Publication Data
US 2024/0081021 A1   Mar. 7, 2024

(51) Int. Cl.
*H05K 7/20* (2006.01)
*G06F 1/20* (2006.01)

(52) U.S. Cl.
CPC .......... *H05K 7/20272* (2013.01); *G06F 1/20* (2013.01); *H05K 7/20254* (2013.01); *H05K 7/20281* (2013.01)

(58) Field of Classification Search
CPC .......... H05K 7/20254–20272; H05K 7/20327–20336; H05K 7/20509–20518
See application file for complete search history.

(56) References Cited

U.S. PATENT DOCUMENTS

| | | | | |
|---|---|---|---|---|
| 5,409,055 A | * | 4/1995 | Tanaka | H01L 23/427 165/104.33 |
| 2002/0117291 A1 | * | 8/2002 | Cheon | G06F 1/20 165/80.4 |
| 2006/0050483 A1 | * | 3/2006 | Wilson | H01L 23/473 361/689 |
| 2006/0227504 A1 | * | 10/2006 | Chen | H05K 7/20909 361/679.52 |
| 2017/0043437 A1 | | 2/2017 | Boday et al. | |
| 2017/0045300 A1 | | 2/2017 | Boday et al. | |
| 2017/0105313 A1 | * | 4/2017 | Shedd | H05K 7/20309 |
| 2017/0221793 A1 | * | 8/2017 | Smalley | H01L 25/0655 |
| 2019/0025896 A1 | | 1/2019 | Bowden et al. | |
| 2020/0089292 A1 | * | 3/2020 | North | G06F 1/206 |
| 2020/0163253 A1 | | 5/2020 | Lunsman et al. | |
| 2021/0305120 A1 | * | 9/2021 | Mallik | H01L 23/562 |

FOREIGN PATENT DOCUMENTS

CN   109634399 A   *   4/2019   ..........   G06F 1/3234

* cited by examiner

*Primary Examiner* — Jacob R Crum
(74) *Attorney, Agent, or Firm* — Brooks, Cameron & Huebsch, PLLC

(57) ABSTRACT

A method includes a liquid cooling manifold cooling a processor component of a system by liquid cooling a first cold plate coupled to the processor component, cooling a memory component of the system by liquid cooling the first cold plate coupled to the memory component, and a liquid cooling a drive component of the system by liquid cooling a second cold plate coupled to the drive component.

15 Claims, 9 Drawing Sheets

LIQUID COOLING MANIFOLD

PRIORITY INFORMATION

This application claims the benefit of India Provisional Application Number 202241050098, filed on Sep. 1, 2022, the contents of which are incorporated herein by reference.

TECHNICAL FIELD

Embodiments of the disclosure relate generally to memory sub-systems, and more specifically, relate to a liquid cooling manifold that cools components of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
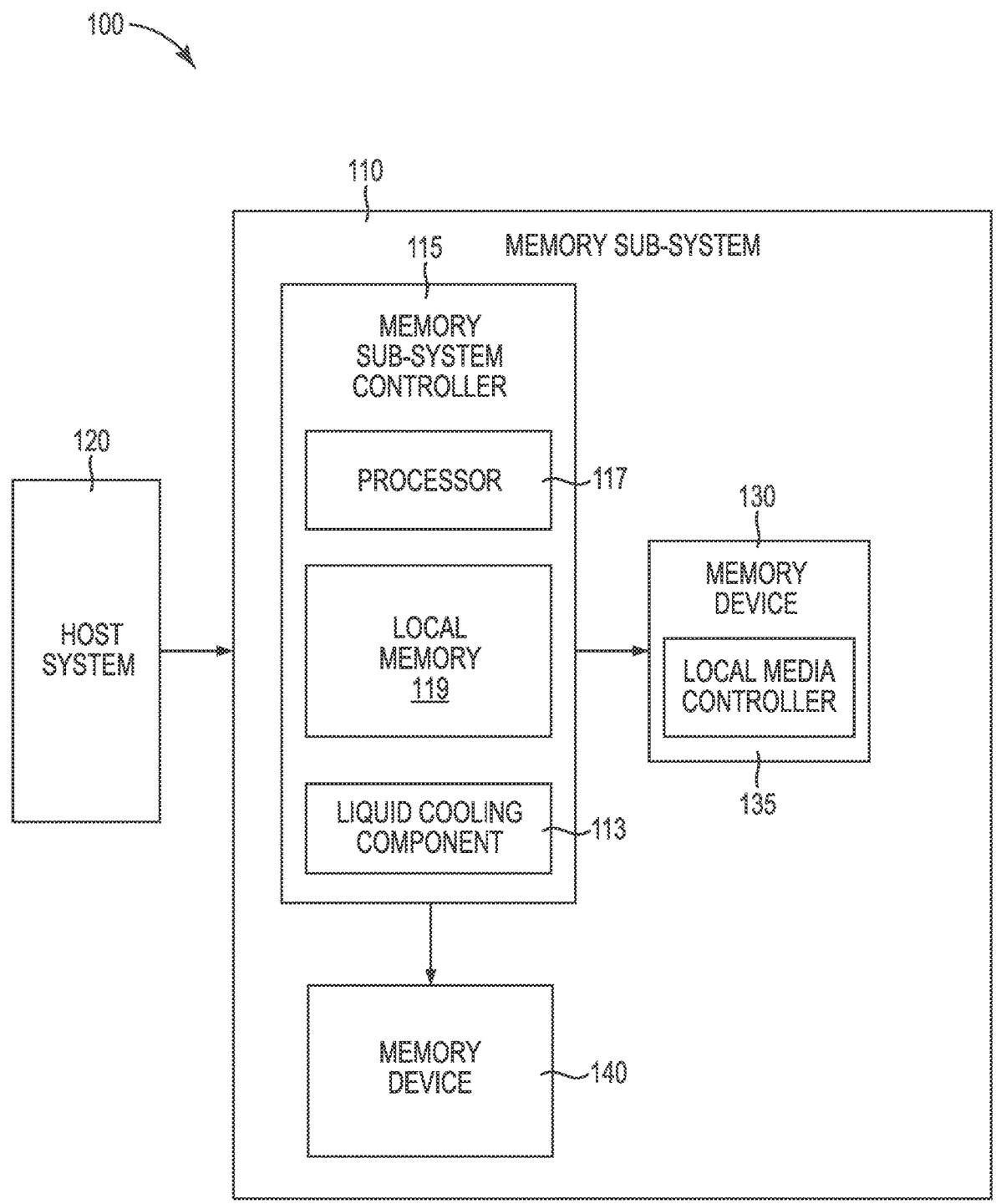
FIG. 1 illustrates an example computing system that includes a memory sub-system in accordance with some embodiments of the present disclosure.

Aspects of the present disclosure are directed to a liquid cooling manifold, in particular to a liquid cooling manifold that cools each of a processor component, a memory component, and a drive component of a system. The system can be or can include a memory sub-system, which can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device such as a negative-and (NAND) memory device (also known as flash technology), or a three-dimensional cross-point memory device that includes a cross-point array of non-volatile memory cells. Other examples of non-volatile memory devices are described below in conjunction with FIG. 1. A non-volatile memory device can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MHLCs), triple level cells (TLCs), and quad-level cells (QLCs). For example, a SLC can store one bit of information and has two logic states.

Memory devices, as well as other computing device components are cooled to remove waste heat produced by the components. The cooling can keep components within permissible operating temperatures limits, which can reduce likelihood of malfunctions or failure. Components susceptible to malfunctions and failures include processing components (e.g., central processing units (CPUs)), drive components (e.g., hard disk drives, drive bays, etc.), and memory components (e.g., double data rate (DDR) random access memory (RAM) devices), among others.

As high storage power density increases with higher data storage requirements, thermal issues, acoustic noise issues, and higher energy costs due to high static pressure fans can arise. In addition, current storage concepts result in restricted processor power (e.g., 140 Watts), restricted memory module power (e.g., 10 Watts), and limit a total power dissipated inside an enclosure. Such limits can cause design issues because of fan redundancy and field replaceable unit scenarios. Current approaches to cooling different components include throttling down processor and memory components, which can result in lower performance results. Further, cooling elements such as fans and heat sinks can reduce a total usable printed circuit board footprint.

Aspects of the present disclosure address the above and other deficiencies. Embodiments of the present disclosure provide a liquid cooling manifold including liquid cooled cold plates that can be implemented in a high-density storage enclosure that includes a smaller footprint, reduced noise, and reduced power requirements, as compared to previous approaches.

The liquid cooling manifold can be part of a system including a processor component (e.g., a high-wattage processor), a memory component (e.g., a DDR5 RAM), and a drive component (e.g., a 25 W NVMe SSD/EDSFF), and can cool each of the components. The system can support increased DDR power (e.g., greater than 20 W) and increased processor power (e.g., greater than 140 W) as compared to previous approaches. This can increase computation and data accessibility, while saving system power and reducing noise by reducing or eliminating static pressure fans. A cooling efficiency of the system can improve over air-cooled systems.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DINM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a liquid cooling component 113. Although not shown in FIG. 1 so as to not obfuscate the drawings, the liquid cooling component 113 can include various circuitry to facilitate liquid cooling of a processor component, a memory component, and a drive component of a system. In some embodiments, the liquid cooling component 113 can include special purpose circuitry in the form of an ASIC, FPGA, state machine, and/or other logic circuitry that can allow the liquid cooling component 113 to orchestrate and/or perform operations to cool system components, as discussed further herein.

In some embodiments, the memory sub-system controller 115 includes at least a portion of the liquid cooling component 113. For example, the memory sub-system controller 115 can include a processor 117 (processing device) configured to execute instructions stored in local memory 119 for performing the operations described herein. In some embodiments, the liquid cooling component 113 is part of the host system 110, an application, or an operating system.

In a non-limiting example, an apparatus (e.g., the computing system 100) can include a memory sub-system liquid cooling component 113. The memory sub-system liquid cooling component 113 can be resident on the memory sub-system 110. As used herein, the term "resident on" refers to something that is physically located on a particular component. For example, the memory sub-system liquid cooling component 113 being "resident on" the memory sub-system 110 refers to a condition in which the hardware circuitry that comprises the memory sub-system liquid cooling component 113 is physically located on the memory sub-system 110. The term "resident on" can be used interchangeably with other terms such as "deployed on" or "located on," herein.

Figure 2A:
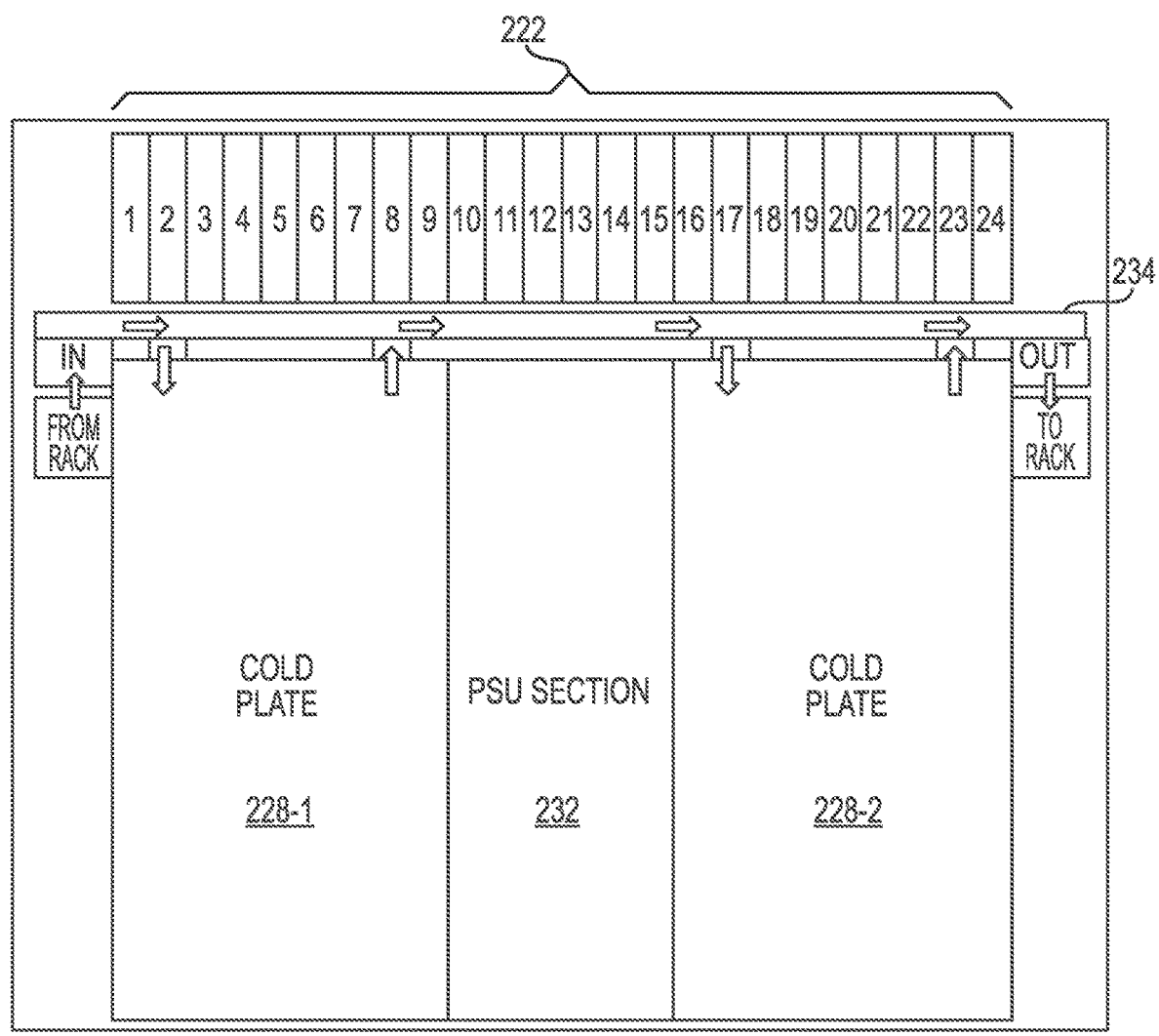
FIG. 2A-2B are block diagrams of a top view and a side view, respectively, of a liquid cooling system.
Figure 2B:
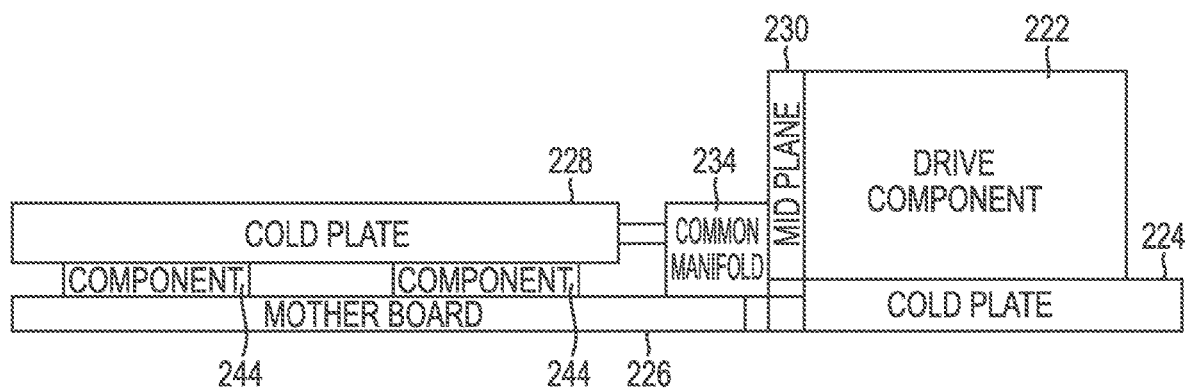

FIG. 2A-2B are block diagrams of a top view and a side view, respectively, of a liquid cooling system. The system (e.g., a 2U24 high storage computing node system) includes a liquid cooling manifold 234 (e.g., a common liquid cooling manifold) that cools each of a processor component 244, a memory component, and a drive component 222 via cold plates 228-1, 228-2, and 224. As used herein, a processor component 244 can include a central processing unit, a processor, processing resource, or other processing component. A memory component (not shown in FIG. 2A-2B) can include a memory device such as a DRAM memory device. A drive component 222 can include a drive or drive bay including a plurality of drives. More than one drive component 222, one processor component 244, and one memory component may be cooled using the liquid cooling manifold 234.

The liquid cooling manifold 234 can be coupled to the cold plate 228 and to the cold plate 224 and can cool the processor component 244 and the memory component of the system by liquid cooling the cold plate 228 coupled to the processor component 244 and the memory component. The liquid cooling manifold 234 can cool the drive component 222 of the system by liquid cooling the cold plate 224 coupled to the drive component. The liquid cooling manifold 234 can control flow rates of a cooling liquid through flow paths of the cold plate 228 and the cold plate 224 that originate at the liquid cooling manifold 234. The flow directions are illustrated by arrows in FIG. 2A.

The cold plate 228, which may comprise two cold plates 228-1, 228-2 separated by a power supply unit 232, is coupled to the liquid cooling manifold 234 to cool the memory component and the processor component 244, both of which may be located on a motherboard 226. The drive component 222 can include a plurality of drives (e.g., small form factor (SFF) drives) and may be separated physically from the liquid cooling manifold 234 by a midplane 230, although examples are not so limited. The liquid cooling manifold 234 is coupled to a cold plate 224 used to cool the drive component 222. The liquid cooling manifold 234 utilizes a plurality of flow channels (also referred to herein as a "flow path") throughout the cold plates 228-1, 228-2, and 224 to cool the memory component, the processor component 244, and the drive component 222.

Figure 3A:
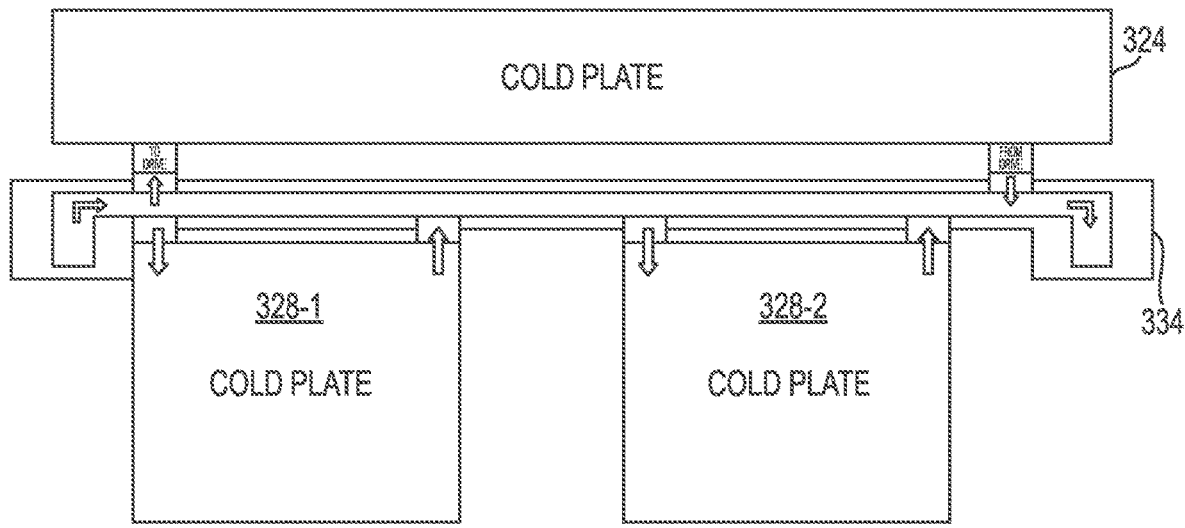
FIG. 3A-3B are block diagrams of a top view and a front view, respectively, of a liquid cooling fluid channel arrangement.
Figure 3B:
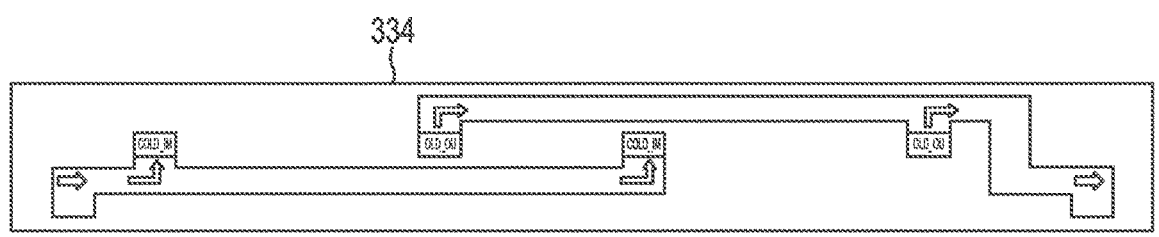

FIG. 3A-3B are block diagrams of a top view and a front view, respectively, of a liquid cooling fluid channel arrangement. The liquid cooling manifold 324 provides a liquid cooling channel for drives of varying capacities of the drive component via the cold plate 324. The liquid cooling manifold 324 provides liquid cooling channels for the processor component and the memory component via the cold plates 328-1 and 328-2. For instance, the cooling paths illustrated in FIG. 3A-3B illustrate fluid in and fluid out paths for the cold plates 328-1 and 328-2, with the arrows indicating the direction of flow of the cooling liquid. The cold plates 328-1, 328-2, and 324 provide localized cooling by transferring heat from the processor component, memory component, and drive component and may comprise aluminum, copper, silver, copper alloys, silver alloys, or other materials that dissipate heat. Cooling liquids (e.g., coolants) can include water, oil, a glycol-water mixture, among others.

Figure 4:
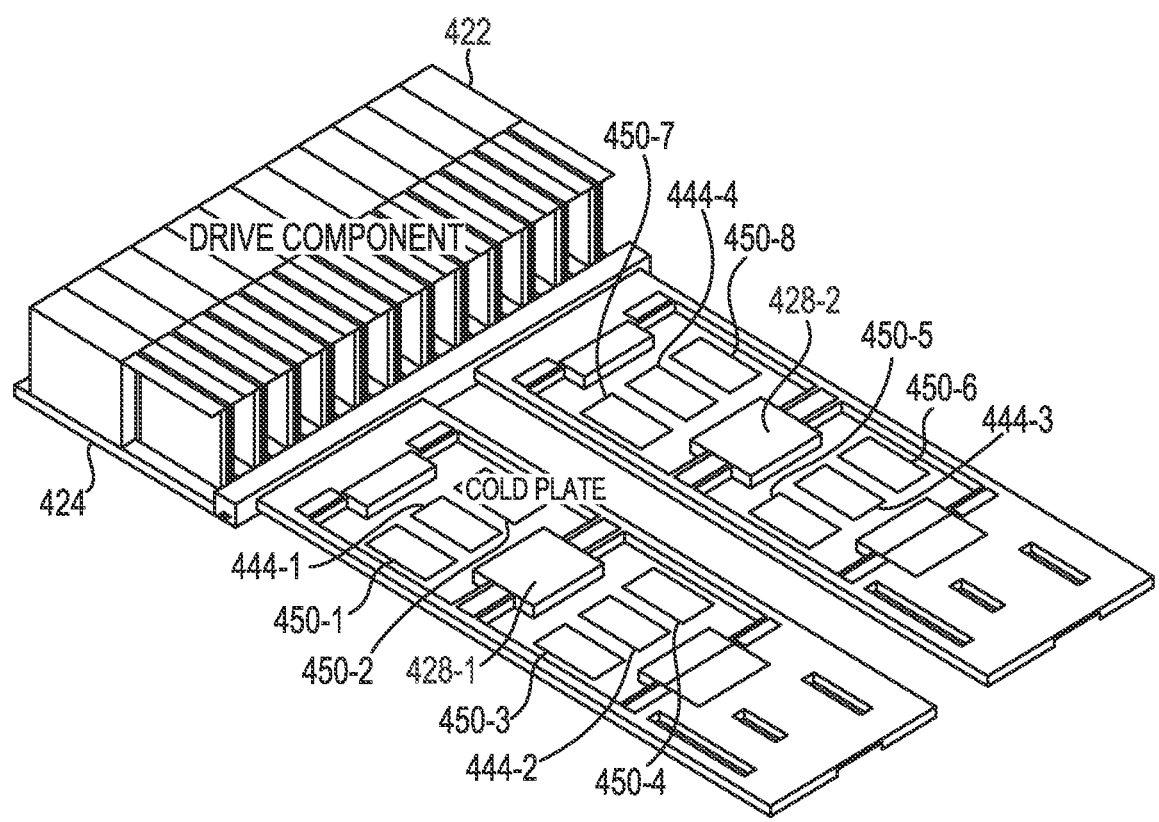
FIG. 4 is a block diagram of a cold plate mechanical assembly.

FIG. 4 is a block diagram of a cold plate mechanical assembly. The assembly includes cold plates 424, 428-1, and 428-2. While three cold plates are illustrated herein, more or fewer cold plates may be present in the assembly. The cold plate 424 can include a flow channel or flow channels for liquid cooling the drive component 422. Cooling liquid flow rates can be controlled with the liquid cooling manifold to a particular target pressure drop, allowing heat to dissipate from the drive component 422. The drive component 422 is illustrated as a drive bay housing a plurality of drives, though examples are not so limited. In some instances, the cold plate 424 may include more than one cold plate or may be divided into sections having independent flow channels assigned to portions of the drive component 422.

The cold plates 428-1 and 428-2 can include flow channels for liquid cooling the processor components 444-1, 444-2, 444-3, 444-4 and the memory components 450-1, 450-2, . . . , 450-8. While four processor components 444 and eight memory components 450 are illustrated in FIG. 4, more or fewer processor components 444 and memory components 450 may be present.

Figure 5:
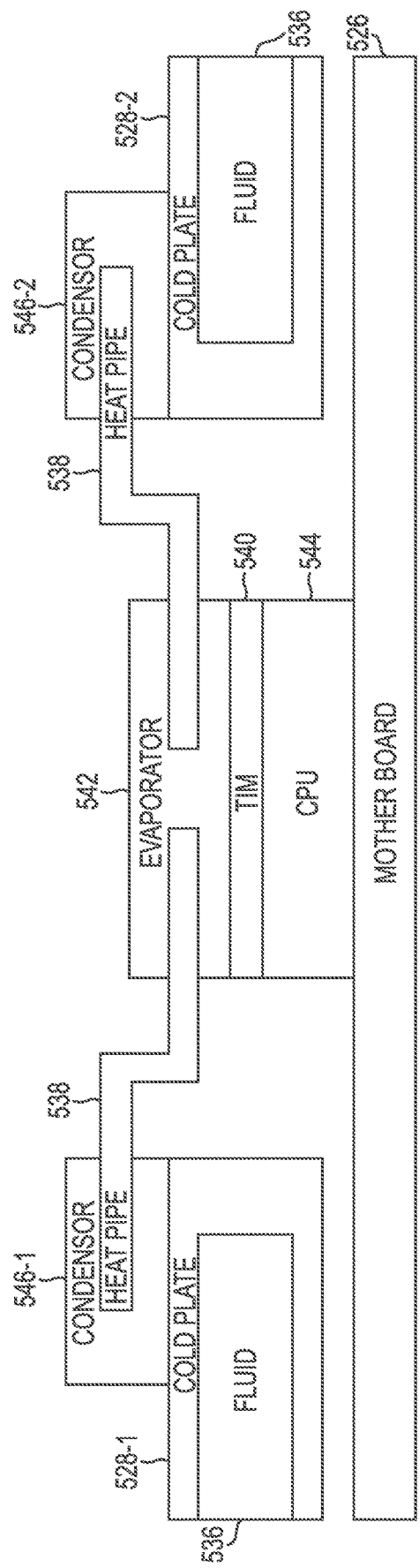
FIG. 5 is a block diagram of a processor component cooling arrangement in accordance with some embodiments of the present disclosure.

FIG. 5 is a block diagram of a processor component 544 cooling arrangement in accordance with some embodiments of the present disclosure. A heat sink design can be used such that a cold plate or cold plates 528-1, 528-2 contacts the heat pipe 538 and works as a condenser 546-1, 546-2 to extract heat from the processor component 544 located on the motherboard 526. The processor component 544 is integrated with and/or contacts the heat pipe to act as an evaporator. In some examples, the heat pipe is integrated with and/or contacts thermal interface material 540 to act as the evaporator, along with or alternatively to the processor component 544. The liquid cooling manifold can cool the cold plates 528-1, 528-2 using particular fluid channels and fluid 536 flowing at a particular pressure through the fluid channels or until a particular pressure drop is reached. Such an arrangement allows for high wattage processor components to be adequately cooled using an integrated heat pipe 538 and the cold plates 528-1, 528-2.

Figure 6:
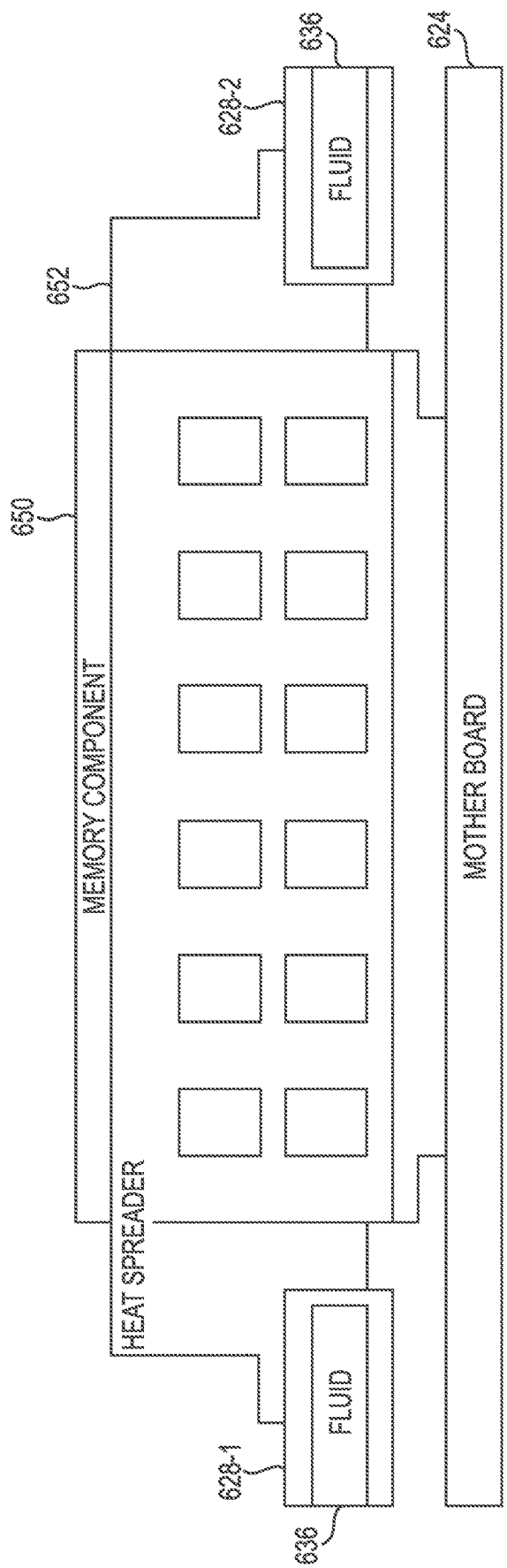
FIG. 6 is a block diagram of a memory component cooling arrangement in accordance with some embodiments of the present disclosure.

FIG. 6 is a block diagram of a memory component 650 cooling arrangement in accordance with some embodiments of the present disclosure. The memory component 650 (e.g., a DIMN) can be integrated with a heat spreader 652 fit to the cold plates 628-1, 628-2 (e.g., snap fit) to transfer heat from the memory component 650. The liquid cooling manifold can cool the cold plates 628-1, 628-2 using particular fluid channels and fluid 336 flowing through the fluid channels at a particular pressure or until a particular pressure drop is reached. Such an arrangement can allow for improved access to the memory component 650, allowing for improved serviceability.

Figure 7:
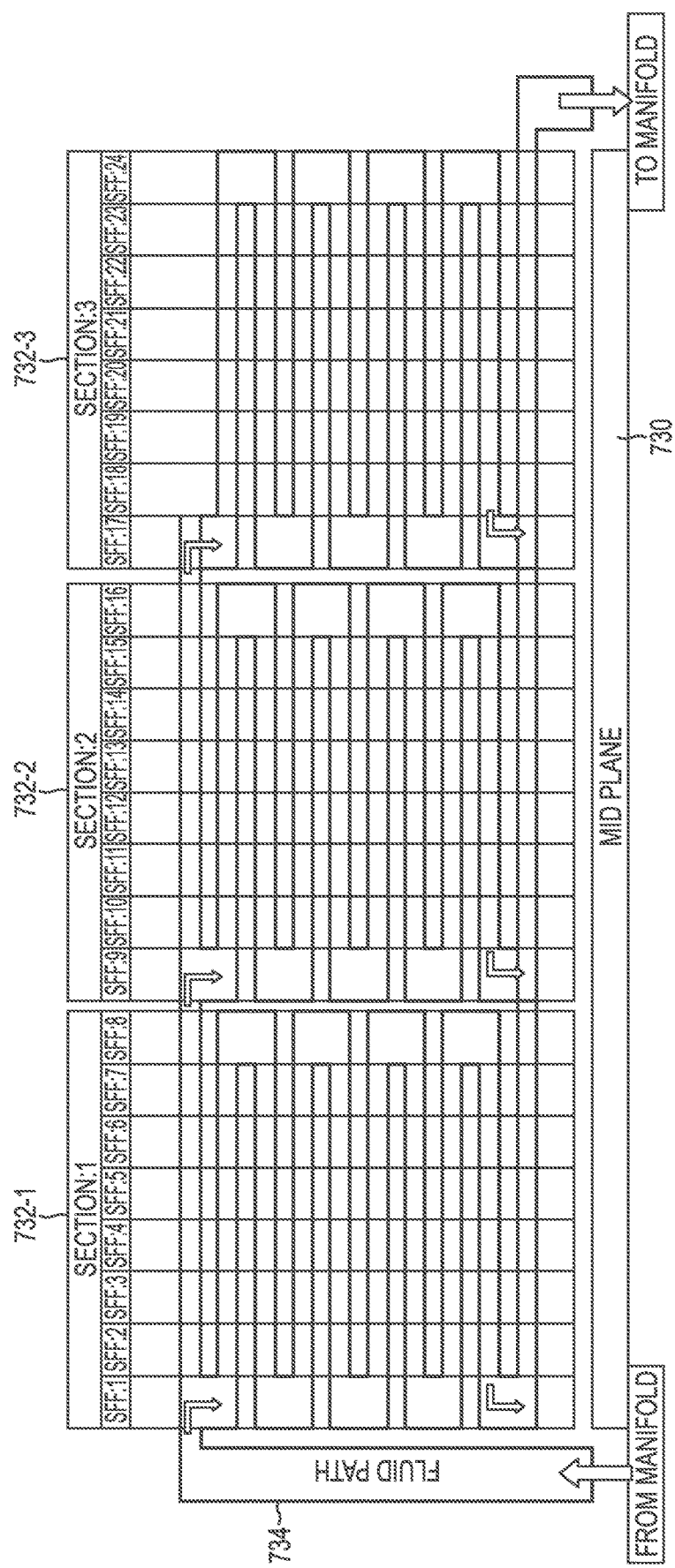
FIG. 7 is a block diagram of a drive component cooling arrangement in accordance with some embodiments of the present disclosure.

FIG. 7 is a block diagram of a drive component cooling arrangement in accordance with some embodiments of the present disclosure. The drive component, located against the midplane 730 and coupled to a cold plate, can include a drive bay, in some examples, and the drive bay can be separated into a plurality of sections 732-1, 732-2, 732-3. The plurality of sections 732-1, 732-2, 732-3 can include an equal number of drives (e.g., solid-state drives (SSD), EDSFF SSDs, etc.). While FIG. 7 illustrates three sections, the drive component may be separated into more or fewer sections.

The cold plate is coupled to the liquid manifold, and cooling the drive component can include a utilizing multi-channel coolant flow path 734 within the cold plate that allows for homogenous cooling of the drive component. The multi-channel coolant flow path 734 can include a heat flux portion having a plurality of sections. For instance, each section of drives 732-1, 732-2, 732-3 receives fresh coolant from the cold plate (e.g., coolant with a common initial temperature) coupled to the drive component such that there is no mixing of the fluid between sections of the heat flux portion. The liquid cooling manifold liquid cools the drive component using fluid flowing through the multi-channel coolant flow path. This multi-channel coolant path 734 in the cold plate and sectioned drive component results in increased heat transfer from the drive component.

In some examples, the cold plate is divided into a plurality of sections, with each section having its own coolant flow path to cool an associated section of the drive component. For instance, section 732-1 includes eight drives cooled by a first coolant flow path, section 732-2 includes eight drives cooled by a second coolant flow path, and section 732-3 includes eight drives cooled by a third coolant flow path. Each coolant flow path may be a section of a single cold plate or may be on its own individual cold plate. Liquid coolant enters the multi-channel coolant flow path 734 from the liquid cooling manifold and exits the liquid multi-channel coolant flow path 734 into the liquid cooling manifold.

The cold plate coupled to the drive component, in some examples, can include a heat spreader. The liquid cooling manifold can cool the drive component using the heat spreader to extract heat from the drive component.

Figure 8:
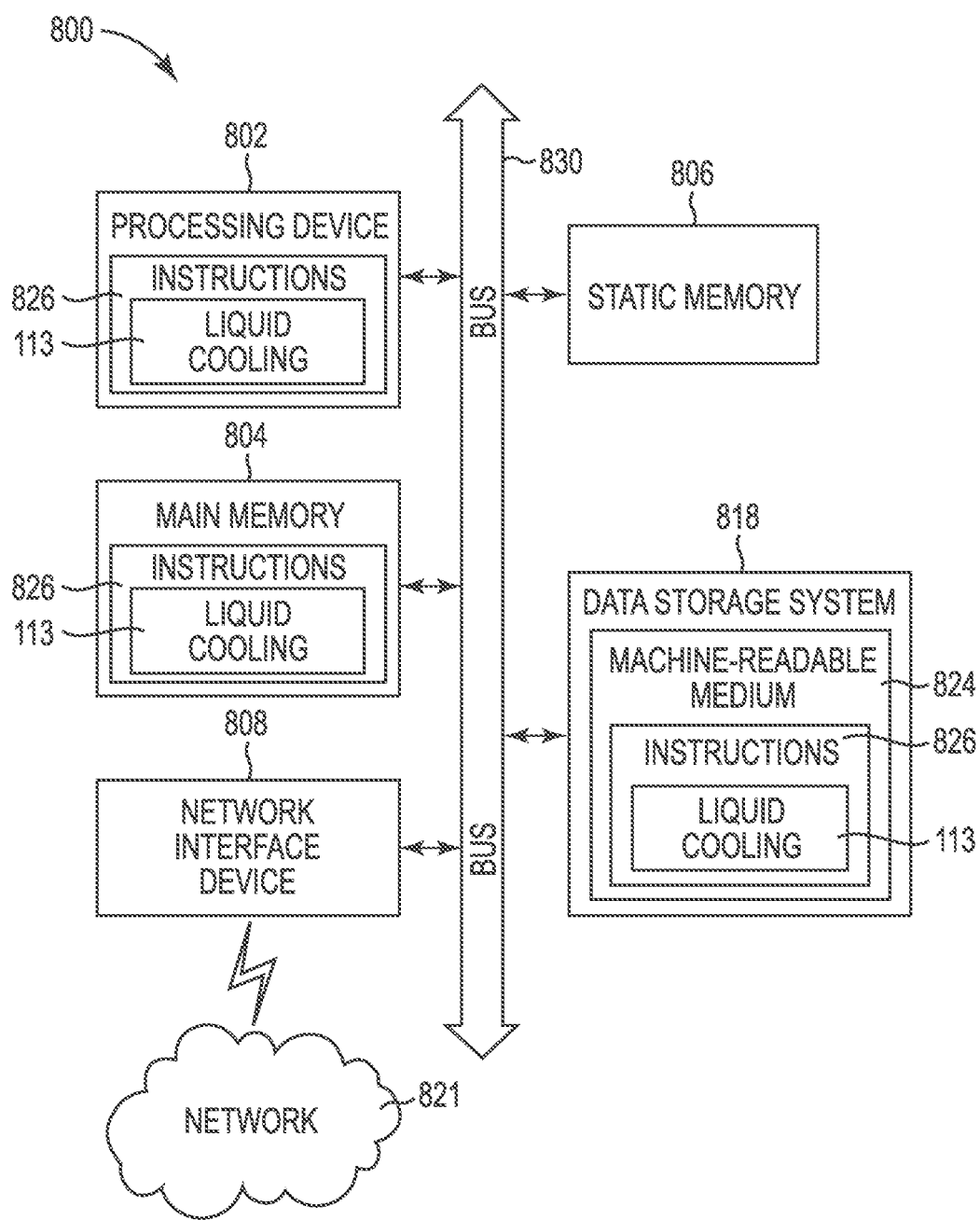
FIG. 8 is a block diagram of an example computer system in which embodiments of the present disclosure may operate.

FIG. 8 is a block diagram of an example computer system 800 in which embodiments of the present disclosure may operate. FIG. 8 is a block diagram of an example computer system 800 in which embodiments of the present disclosure may operate. For example, FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the liquid cooling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

The processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 821.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a liquid cooling component (e.g., the liquid cooling component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A liquid cooling manifold coupled to a first cold plate and a second cold plate and configured to:
    cool a processor component of a system by liquid cooling the first cold plate coupled to the processor component, wherein the cooling of the processor component comprises:
        a first heat pipe to transfer heat from the processor component;
        a first portion of the first cold plate coupled to the liquid cooling manifold and contacting the first heat pipe to extract heat from the processor component;
        a second heat pipe to transfer heat from the processor component; and
        a second portion of the first cold plate coupled to the liquid cooling manifold and contacting the second heat pipe to extract heat from the processor component;
    cool a memory component of the system by liquid cooling the first cold plate coupled to the memory component; and
    cool a drive component of the system by liquid cooling a second cold plate coupled to the drive component.

2. The liquid cooling manifold of claim 1, further configured to control flow rates of a cooling liquid through a flow path originating at the liquid cooling manifold.

3. The liquid cooling manifold of claim 2, further configured to control flow rates of the cooling liquid comprises the liquid cooling manifold controlling the flow rates of the cooling liquid to a particular target pressure drop.

4. The liquid cooling manifold of claim 1, further configured to:
    liquid cool the first cold plate via a first coolant path; and
    liquid cool the second cold plate via a second, multi-channel coolant path.

5. The liquid cooling manifold of claim 1, further comprising the system located within a high-density storage enclosure.

6. The liquid cooling manifold of claim 1, wherein the memory device is a double data rate (DDR) random-access memory (RAM) device.

7. The liquid cooling manifold of claim 1, wherein the drive component is a drive bay comprising a plurality of drives.

8. A system, comprising:
    a processor component;
    a first cold plate coupled to the processor component;
    a memory component;
    a second cold plate coupled to the memory component; and
    a liquid cooling manifold configured to:
        cool the memory component via the second cold plate, wherein the second cold plate is coupled to the liquid cooling manifold; and
        cool the processor component via the first cold plate, wherein the processor component is coupled to the liquid cooling manifold, and the cooling of the processor component comprises:
            a first heat pipe to transfer heat from the processor component;
            a first portion of the first cold plate coupled to the liquid cooling manifold and contacting the first heat pipe to extract heat from the processor component;
            a second heat pipe to transfer heat from the processor component; and
            a second portion of the first cold plate coupled to the liquid cooling manifold and contacting the second heat pipe to extract heat from the processor component.

9. The system of claim 8, wherein the memory component is a 2U24 flash storage computing node.

10. The system of claim 8, wherein the first cold plate and the second cold plate comprise one cold plate coupled to both the memory component and the processor component.

11. A system, comprising:
    a liquid cooling manifold located within a high-density storage enclosure and configured to:
        cool a memory component via a first cold plate, wherein the first cold plate is coupled to the liquid cooling manifold;
        cool a first section of a drive component via a first section of a second cold plate;
        cool a second section of the drive component via a second section of the second cold plate, wherein the second cold plate is coupled to the liquid cooling manifold; and
        cool a processor component coupled to the liquid cooling manifold, the cooling of the processor component comprising:
            a first heat pipe to transfer heat from the processor component;
            a first portion of the first cold plate coupled to the liquid cooling manifold and contacting the first heat pipe to extract heat from the processor component;
            a second heat pipe to transfer heat from the processor component; and
            a second portion of the first cold plate coupled to the liquid cooling manifold and contacting the second heat pipe to extract heat from the processor component.

12. The system of claim 11, wherein the processor component is in contact with the first heat pipe and the second pipe and acts as an evaporator.

13. The system of claim 11, wherein the first portion of the first cold plate is in contact with the first heat pipe and the second portion of the first cold plate is in contact with the second heat pipe and act as condensers.

14. The system of claim 11, wherein the drive component comprises a drive bay having small form factor (SFF) drives of varying capacity.

15. The system of claim 11, wherein the memory component comprises a dual in-line memory module (DIMM).

* * * * *